Jan. 20, 1970     H. J. SHOCKEY ET AL     3,490,978
METHOD OF BEDDING PANELS INTO FRAMES
Filed March 15, 1966     3 Sheets-Sheet 1
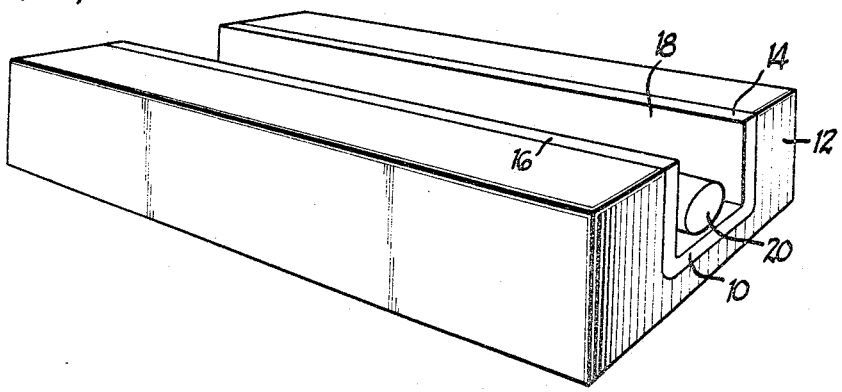
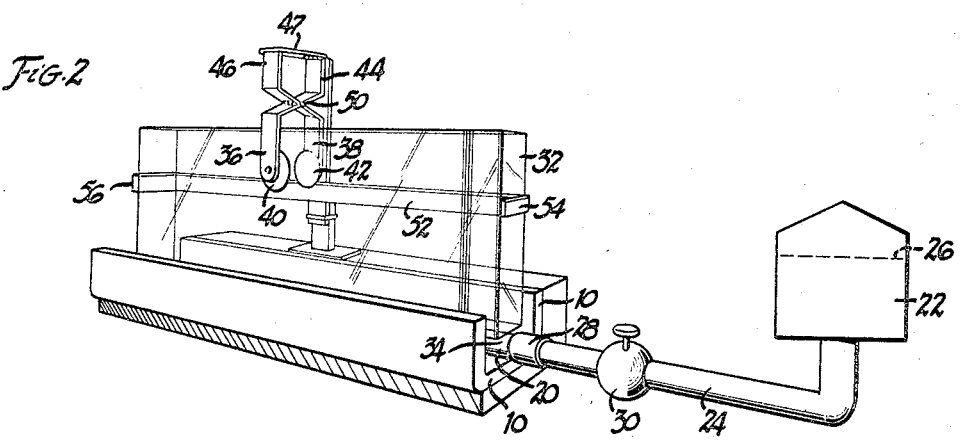
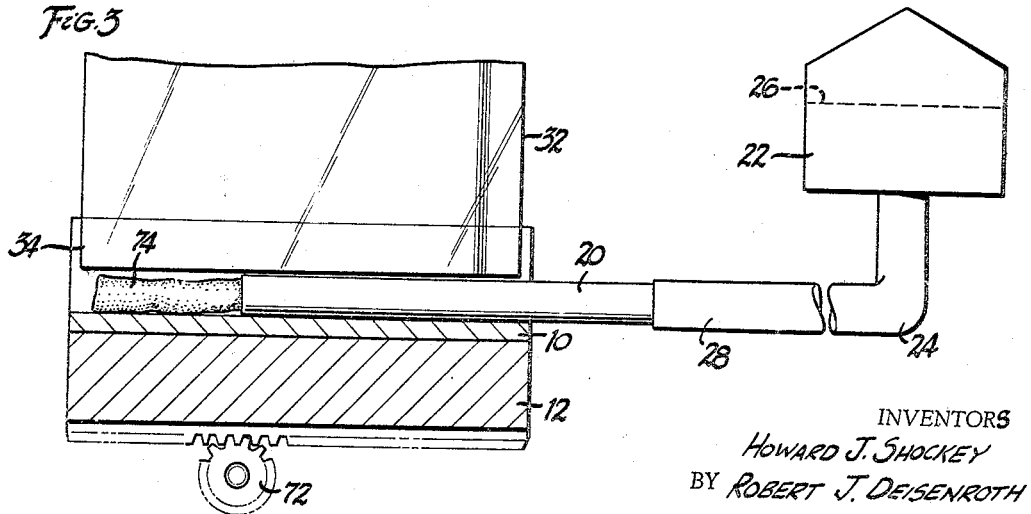
INVENTORS
HOWARD J. SHOCKEY
BY ROBERT J. DEISENROTH
Wilson, Settle, Batchelder
ATT'YS.   & Craig INVENTORS
HOWARD J. SHOCKEY
BY ROBERT J. DEISENROTH
Wilson, Settle, Batchelder
ATTYS. & Craig Jan. 20, 1970 H. J. SHOCKEY ET AL 3,490,978
METHOD OF BEDDING PANELS INTO FRAMES
Filed March 15, 1966 3 Sheets-Sheet 3

INVENTORS
HOWARD J. SHOCKEY
BY ROBERT J. DEISENROTH

Wilson, Settle, Batchelder
ATT'YS. & Craig

United States Patent Office 3,490,978
Patented Jan. 20, 1970

3,490,978
METHOD OF BEDDING PANELS INTO FRAMES
Howard J. Shockey and Robert J. Deisenroth, Elkhart, Ind., assignors to Excel Corporation, Elkhart, Ind., a corporation of Indiana
Filed Mar. 15, 1966, Ser. No. 534,504
Int. Cl. B32b *31/04*
U.S. Cl. 156—293                                    8 Claims

ABSTRACT OF THE DISCLOSURE

The method relates to the bedding of a panel into a frame which has interior surfaces defining a recess for receiving a marginal edge of the panel. In the method, a tube containing flowable bedding material is placed in the recess of the frame. Then, the tube is moved relative to the frame to withdraw the tube from the frame in a direction lengthwise along the frame. Simultaneously, flowable bedding is expelled from the tube to deposit the material on the interior surface of the frame. The marginal edge of the panel is then placed in the bedding material. The bedding material is then heated to cure to a rigid form to provide a bed for the panel in the frame which adheres to the panel and to the frame.

CROSS-REFERENCE TO RELATED APPLICATION

This application is related to a co-pending application of Robert J. Deisenroth, Ser. No. 222,590, filed Sept. 10, 1962, now Patent No. 3,263,014, issued July 26, 1966, and assigned to the present assignee.

BACKGROUND OF THE INVENTION

One application in which panels are bedded into frames is in the manufacture of windows for automotive vehicles. It is well known that the glass of an automobile window frequently has a frame member extending along at least one edge of the glass and in some cases more than one edge is framed. One of the known and rather commonly used methods of bedding glass panels into frames involves the use of strips of uncured rubber material. A worker folds a rubber strip over the edge of the window and then inserts the edge with the folded-over rubber into the channel-shaped frame. Any excess rubber material is trimmed off with a hot knife and the window is ordinarily cleaned before the bedding process is completed. Variations in glass thickness require the use of different thicknesses of rubber. The whole operation is carried out by hand, and it is evident that this manual method has relatively high labor costs. It has other disadvantages too; for example, the rubber strips do not hold up well with weathering, the process is relatively messy, and tapes of different thicknesses must be used to compensate for variations of glass thickness.

A bedding method has been proposed wherein liquid bedding material is initially injected between the frame and the panel, and the liquid is subsequently cured to a solid state to form a permanent bedding for the panel. This method automatically compensates for variations in glass thickness, does not require trimming and is a clean procedure and does not require washing or other cleaning of the glass and frame assembly. A method of this type is described in a co-pending application of Robert J. Deisenroth, Ser. No. 222,590, filed Sept. 10, 1962, which has matured into the above-mentioned U.S. Patent No. 3,263,014 and is assigned to the assignee of this application. Reference may be made to the Deisenroth patented application for detailed information on the method.

In spite of the many advantages of the method of the said patented application over the method using rubber strips, the former method does have some drawbacks. The edges of the frame member must be sealed before the liquid material is injected into the space within the frame member. The material is injected in liquid condition, and care must be exercised to keep the liquid from spilling or running over onto the apparatus involved in the operation.

The method of the present invention proposes to place flowable bedding material in a recess of a frame member by expelling the bedding material from a tube which is initially placed in the frame member and is then relatively withdrawn from the frame member as the bedding material is expelled from it. The tube with the bedding material in it may be handled conveniently so there is less difficulty in handling the bedding material before it is placed in the frame. After the flowable bedding material has been expelled from the tube into the frame member, the marginal edge of a panel is inserted into the frame member and into the bedding material therein so as to displace some of the bedding material into the spaces between side surfaces of the panel and side surfaces of the frame member. The assembly of frame, panel and bedding material may then be placed in an oven at an elevated temperature for a prescribed time in order to cure the bedding material to its solid form. In this form, the bedding material is adherent both to the metal frame member and to the glass panel and provides a rigid bed for the panel in the frame.

It is an object of the present invention to facilitate the handling of flowable bedding material in the bedding of panels into frames.

Another object of the invention is to provide a procedure for introducing flowable bedding material in a rather viscous form between a panel and a frame, the bedding material ultimately being cured by heat to a rigid form to provide a bed for the panel in the frame.

Another object of the invention is to provide a method of bedding wherein a tube containing flowable bedding material is placed in a recess in a frame, bedding material is expelled from the tube into the frame as the tube is withdrawn from the frame, and after placing an edge of a panel into the bedding material it is cured by heat to a rigid form.

A further object of the invention is to provide a method of bedding a panel into a frame wherein bedding material is expelled from a tube into the frame by feeding additional bedding material to and through the tube under pressure.

Another object of the invention is to expel flowable bedding material from a flexible, resilient tube into a frame by squeezing the tube as between rollers.

Other objects of this invention will appear in the following description and appended claims, reference being had to the accompanying drawings forming a part of this specification wherein like reference characters designate corresponding parts in the several views.

On the drawings:

FIGURE 1 is a perspective view of a frame mounted in a fixture block and a tube containing flowable bedding material received and retained in the frame;

FIGURE 2 is a perspective view, partly in section, showing a glass panel inserted at one edge into the frame of the assembly of FIGURE 1 together with a clamping structure for holding the panel in place;

FIGURE 3 is a vertical sectional view of the assembly of FIGURE 2 showing the frame, tube and panel assembly as the frame and panel are moved relative to the tube to withdraw the tube from the frame while expelling flowable bedding material from the tube into the frame;

Figure 4:
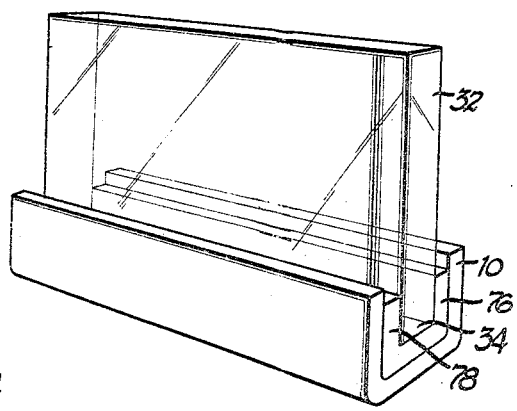
FIGURE 4 is a perspective view of the frame and panel assembly after the bedding material has been cured to permanently bed the panel into the frame.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, a frame member 10 having a channel-shape in section is mounted in a recess in a fixture block 12 such that the top edges 14 and 16 of the frame member are flush with the top surface of the fixture block. The interior surfaces 18 of the frame member 10 form a recess in which a tube 20 is received. The tube 20 is preferably oval and preferably is made of metal so as to retain its shape. The tube 20 provides a conduit for supplying flowable bedding material into the recess of the frame member 10. This is accomplished by connecting the tube 20 to a source 22 of flowable bedding material from which the bedding material is supplied to the tube as through a conduit 24 (FIGURE 2). The source 22 is filled with bedding material up to a level indicated by a dashed line 26 and there is air under pressure in the source 22 above the dashed line. Thus, there is a head of bedding material above that in the tube 20 and additional pressure is supplied by the air pressure in the source 22.

The tube 20 may have an oval shape with the longer axis of the oval being horizontal so that the tube occupies relatively little vertical space at the bottom of the frame member 10. This tube 20 may be coupled to the conduit 24 for example with a section of rubber tubing 28 which is clamped to the end of tube 20 and to the conduit 24. A valve 30 may be provided in conduit 24 for controlling the flow of bedding material to the tube 20. When the tube 20 is initially placed in the frame 10, it may either be empty or it may contain a charge of flowable bedding material. If the tube is intially empty, flowable bedding material is supplied to it from the source 22 by opening the valve 30 so that bedding material under pressure flows from the source 22 through conduit 24 to the tube 20.

A glass panel 32 is positioned with its marginal edge 34 in the recess of frame 10 just above the tube 20. The panel 32 is held in this position by a fixture assembly including clamping arms 36 and 38 having pads or suction cups 40 and 42 which contact the panel 32 on opposite sides thereof. The clamping arms 36 and 38 are Z-shaped and have actuating portions 44 and 46 which can be spread apart to open the arms 36 and 38 to receive a panel between them. The actuating portions 44 and 46 may be held in closed position by a latch 47. The arms are hinged at 50. The panel 32 is further braced by a cross arm 52 which has clamping end portions 54 and 56 which embrace the panel 32 at its side edges to prevent the panel from moving lengthwise along the frame 10.

Figure 8:
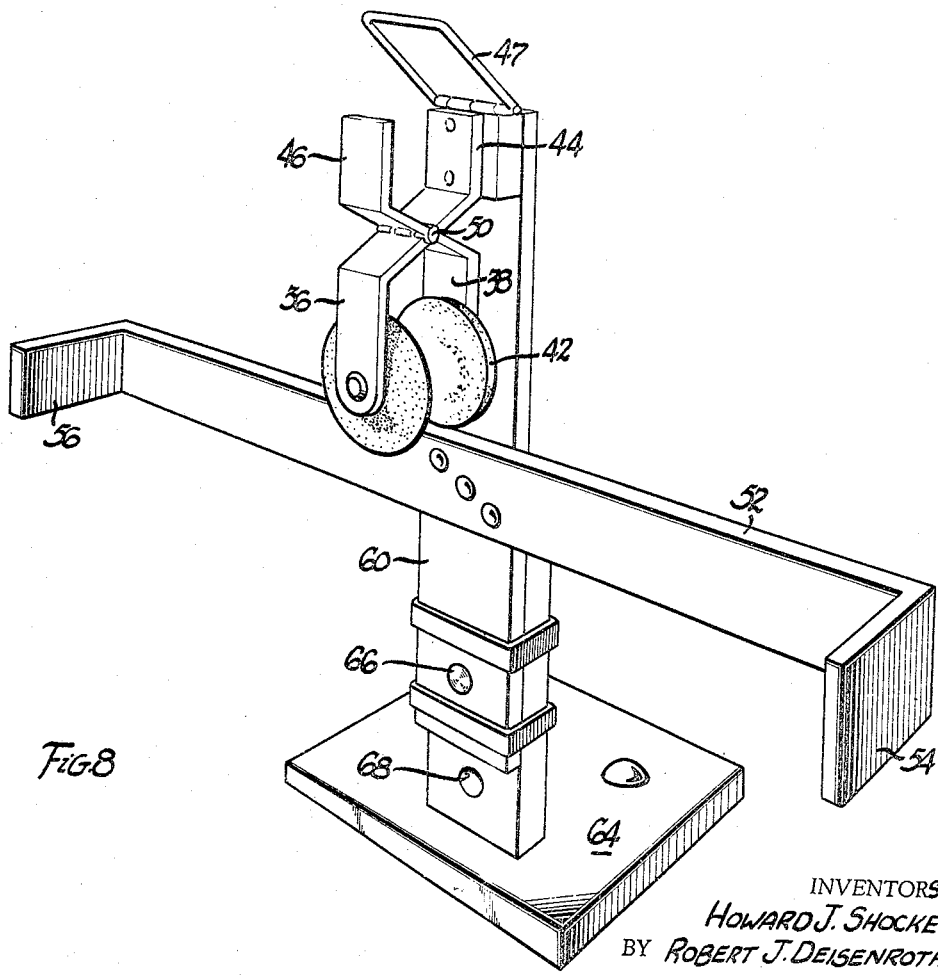
FIGURE 8 is a perspective view of the clamping apparatus included in the assembly of FIGURE 2.

As shown in FIGURE 8, the clamping device including arms 36 and 38 is fastened to a vertical post 60, and the arm 52 is also fastened to post 60. The post 60 is mounted for sliding movement on another post 62 which is fastened at one end to a base 64 which is secured to the top surface of the fixture block 12 such that the posts 60 and 62 are anchored to the fixture block. Post 60 has an aperture 66 extending through it, and there are two apertures extending through post 62, only one of the apertures 68 being visible in FIGURE 8. The other aperture registers with aperture 66 with the post 60 in the position shown in FIGURE 8. A pin may be inserted from the back side of post 62 through the registering aperture in post 62 and into the aperture 66 so as to hold the post 60 in the position shown in FIGURE 8. The post 60 may be lowered until its bottom end butts against base 64, and in this position aperture 66 of post 60 registers with aperture 68 of post 62 so that the pin may be inserted through apertures 66 and 68. In the upper position of post 60, the panel 32 is retained in the position shown in FIGURE 2 wherein its bottom edge 60 is just above the tube 20. After the tube 20 has been withdrawn from the frame, the post 60 is lowered to insert the edge 34 of the panel into flowable bedding material which remains in the frame 10 after the tube 20 has been withdrawn. Thus, the fixture assembly of FIGURE 8 may be manipulated to raise or lower the panel 32 relative to the frame 10.

After the frame 10, the tube 20 and the panel 32 have been assembled as in FIGURE 2, the frame and panel with the associated fixtures may be moved relative to the tube 20 so as to effectively withdraw the tube and at the same time expel flowable bedding material from the tube into the space between the bottom of frame 10 and the bottom edge of frame 34 of panel 32. This operation is shown in FIGURE 3. As indicated in this view, the fixture 12 may be provided with a rack 70 on its bottom face, and a gear 72 may be rotated to drive the whole frame, panel and fixture assembly to the left as viewed in FIGURE 3. This effectively withdraws the tube 20 from the frame 10. It will be understood that the tube 20 could be pulled out of the frame 10 rather than moving the whole frame, panel and fixture assembly in the manner illustrated in FIGURE 3. The rate of withdrawal of the tube 20 is coordinated with the rate at which bedding material is expelled from the tube so as to deposit enough bedding material in the frame to ultimately fill the space between the edge of the panel and the frame after the panel has been fully inserted into the frame.

As the tube 20 is withdrawn, the flowable bedding material 74 is expelled into the frame 10 and rests on its bottom surface as shown in FIGURE 3. The material 24 is to provide a solid, resilient bed for the panel 32 in the frame 10, and the material should have certain properties to fulfill its function. The bedding material may either be a thermosetting plastic or a thermoplastic material having the following properties:

(1) Resiliency—to provide a suitable bedding for the glass.

(2) Adherence—to provide a bond between the glass and the metal frame.

(3) Curability—to a solid state in a relatively short time by the application of heat, for example, within about 45 seconds at about 250° F.

(4) Resistance to weathering—(sunlight, temperature changes and moisture absorption).

(5) Mechanical properties—such as tensile strength, compressive strength, impact resistance and toughness sufficient to withstand the stresses normally encountered during the use of the final assembly.

One class of resins suitable as bedding materials are the polyurethanes. Polyurethane resins are obtained by the reaction of polyisocyanates with organic compounds containing two or more active hydrogens to form polymers having free isocyanate groups. Under the influence of heat, the free isocyanate groups react to form a thermosetting material. A suitable thermosetting form may be prepared from castor oil and triisocyanate. A suitable thermoplastic material is polyvinyl resin.

The consistency of the bedding material may be controlled by adjusting the degree of cure of the material. It is desirable to have the flowable bedding material 74 in a state wherein it is a viscous liquid at the time it is expelled from the tube 20 into the frame 10. Therefore, the bedding material which is supplied to the tube 20 may be partially precured until it has the proper consistency to be expelled from tube 20 without immediately running out of the frame 10.

As soon as the tube 20 has been withdrawn from the frame 10, the panel 32 may be lowered to insert the marginal edge 34 of the panel into the flowable bedding material at the bottom of frame 10. As the panel is inserted into the bedding material, some of the bedding material is displaced and flows upwardly about the side surfaces of panel 34. Some of the bedding material will flow lengthwise of the frame 10, and in order to avoid excessive flow of bedding material out the ends of the frame, it is desirable to have the mass of bedding material 74 terminate short of the ends of the frame member.

The next step is to cure the bedding material to its rigid form in which it bonds adherently both to the metal of frame 10 and the glass of panel 32. This may be accomplished by placing the whole frame, panel, and fixture assembly in an oven maintained at an elevated temperature for a prescribed time. By way of example, the oven may be at a temperature of 250° F., and the assembly may remain in the oven for about 45 seconds. The bedding material may be heated in other ways. For example, heating elements may be built into the fixture 12 to heat frame 10 which in turn heats the bedding material. The frame might be heated by passing current through it or by high frequency induction heating.

The final assembly is shown in FIGURE 4, and it may be seen here that some of the bedding material has been forced up into the spaces 76 and 78 between the side surfaces of panel 32 and the vertical legs of the frame 10. There is further bedding material in the space under the marginal edge 34 of the panel. The bedding material provides a rigid but resilient bed for the panel in the frame and adheres strongly to the glass of the panel and to the metal of the frame.

Figure 5:
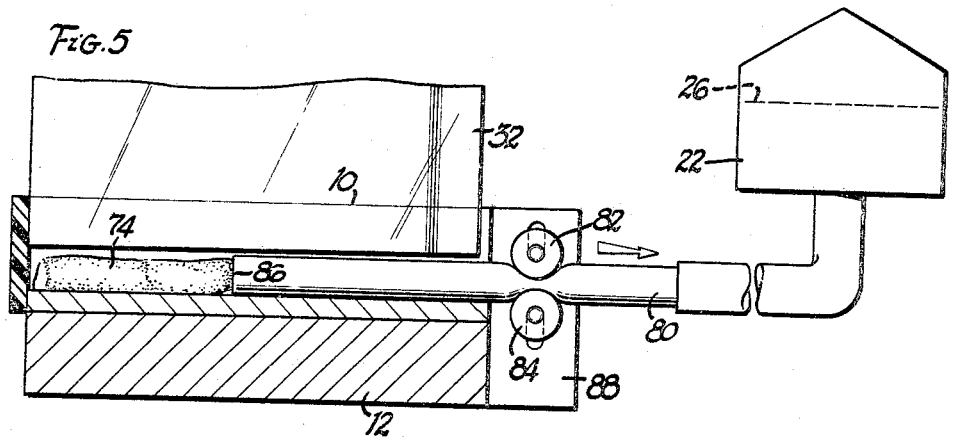
FIGURE 5 is a vertical sectional view similar to FIGURE 3 but showing the tube being squeezed between rollers as the tube is withdrawn from the frame to expel bedding material from the tube into the frame.

FIGURE 5 is similar to FIGURE 3 and illustrates another method embodiment of the invention. In this embodiment, the tube 80 is made of a flexible but resilient material which will spring back to its original shape after it has been deformed. The frame 10, the panel 32, the fixture 12 and the tube 80 are assembled in the manner described in connection with FIGURE 2, and the same type of fixturing may be used to hold the panel 32 in place. Then the tube 80 is withdrawn from frame 10 and at the same time flowable bedding material 74 is expelled from the tube into the frame 10 as shown.

In this embodiment, the tube 80 is withdrawn between a pair of rollers 82 and 84 which squeeze the tube 80 as it passes between the rollers. This squeezing action forces bedding material out the open end 86 of the tube as the tube withdraws from frame 10. The rollers 82 and 84 may be mounted on a suitable bracket 88. Again, the rate of withdrawal of the tube and the rate at which bedding material is expelled from the tube are coordinated to deposit enough material to fill the final space between the panel edge and the frame. This may be done by adjusting the spacing between the rollers 82 and 84. The panel is lowered into the frame as soon as the tube is withdrawn.

Figure 6:
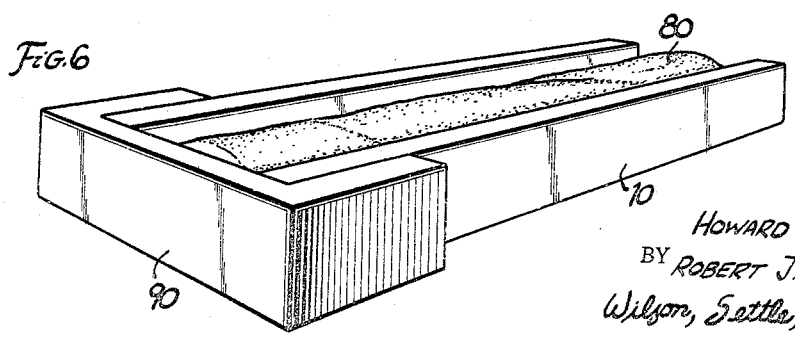
FIGURE 6 is a fragmentary perspective view of one end of the tube and frame assembly showing an end cap attached to the frame and closing its open end.

To assure that none of the bedding material 74 flows out the open end of frame 10, the left-hand end may be closed as by placing a cap member 90 over the end of the frame. A fragmentary view of the frame 10, tube 80 and cap 90 is shown in FIGURE 6 to better illustrate how the cap member 90 fits over the end of frame 10. The cap member may be made of silicone rubber or some other material which will part easily from the bedding material 74 so that the cap may be removed from the frame after the curing step. In the curing step the flowable bedding material 74 is heated to a temperature which cures it to its rigid form wherein it bonds the panel 32 to the frame 10. The final assembly is exactly the same as that shown in FIGURE 4.

Figure 7:
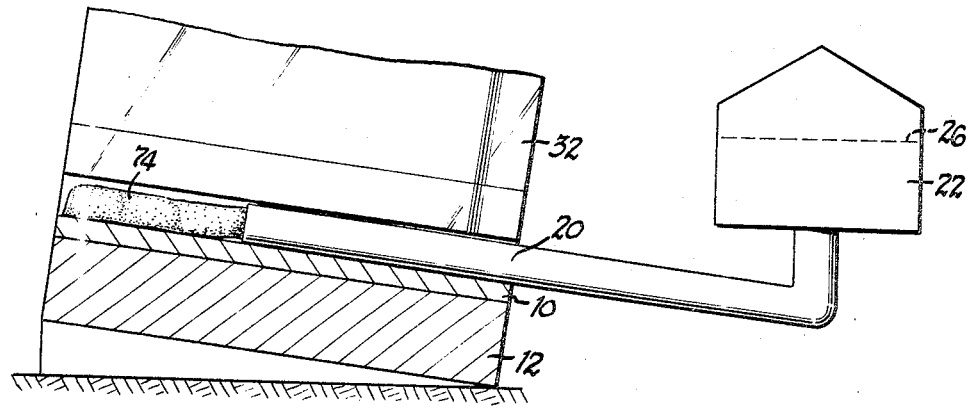
FIGURE 7 shows an assembly like that of FIGURE 3 but held in a tilted position as the tube is withdrawn from the frame to help keep bedding material from flowing out the end of the tube.

FIGURE 7 shows a modification of the step illustrated in FIGURE 3. The assembling of the frame 10, the fixture 12, the tube 20 and the panel 32 is carried out exactly as described in connection with FIGURES 1 through 4. However, as the assembly comprised of the frame, the panel and the fixture is moved so as to withdraw the tube 20 from the frame and simultaneously expel bedding material into the frame, the frame assembly is tilted as shown in FIGURE 7. This tilting of the frame and panel assembly helps to retain the flowable bedding material in the channel recess of the frame so that it does not run out the open end of the frame. The bedding material, as previously described, is a rather viscous liquid which does not flow like water, and by tilting the frame it can be kept within the frame as the tube 20 is withdrawn. When the tube reaches the right hand end of the frame, the frame is shifted to a horizontal position to inhibit the bedding material from flowing out the right hand end of the frame. After the tube has been withdrawn, the panel 32 is fully inserted into the frame and the frame and panel assembly is placed in an oven. In the oven the bedding material is exposed to an elevated temperature to cure the bedding material to its rigid form. The resulting assembly is exactly the same as shown in FIGURE 4.

The invention thus provides a method of introducing flowable bedding material into a space between a panel and a frame by expelling the material from a tube placed between the panel and the frame, and after placing an edge of the panel into the bedding material, curing the bedding material to a rigid form by heat. The bedding material is easily handled in this manner. As a result of the method, a firm but resilient bed is provided for the panel in the frame.

We claim:
1. A method of bedding a panel into a frame having an interior surface defining a recess for receiving a marginal edge of said panel, said method comprising the steps of placing a flexible tube, which tube contains flowable bedding material, in said recess of said frame, said bedding material being curable by heat to a rigid form in which said bedding material is adherent to said frame and to said panel, relatively moving said tube and said frame to relatively withdraw said tube from said frame in a direction lengthwise along said frame and simultaneously squeezing said tube to expel flowable bedding material from said tube to deposit said bedding material on said interior surface of said frame in said recess, placing a marginal edge portion of said panel in the bedding material in said recess, and heating the bedding material in said recess to cure the same to said rigid form thereof and thereby provide a bed for said panel in said frame which adheres to said panel and said frame.

2. The method of claim 1 in which in placing said marginal edge portion of said panel in said flowable bedding material in said frame some of the bedding material is displaced into a space between side surfaces of said panel and side surfaces of said frame.

3. The method of claim 1 in which an end of said frame is dammed to keep the expelled flowable bedding material in said frame.

4. The method of claim 1 in which said panel and said frame are tilted lengthwise thereof to keep the expelled flowable bedding material in said frame.

5. The method of claim 1 in which said tube is squeezed at a point located outside said frame to expel material from said tube in said recess of said frame.

6. The method of claim 2 in which said tube is squeezed with rollers.

7. The method of claim 6 in which said tube passes between a pair of rollers spaced apart a distance less than the diameter of said tube and located outside said frame adjacent one end thereof.

8. A method of bedding a panel into a frame having an interior surface defining a recess for receiving a marginal edge of said panel, said method comprising the steps of placing a flexible tube, which tube contains flowable bedding material in said recess of said frame, said bedding material being curable by heat to a rigid form in which said bedding material is adherent to said frame and to said panel, assembling a panel with said frame and placing a marginal edge of said panel in said frame recess adjacent said tube, relatively moving said tube and the frame and panel assembly to relatively withdraw said tube from said frame in a direction lengthwise of said frame and simultaneously squeezing said tube to expel flowable bedding material from said tube to deposit said bedding material on said interior surface of said frame in said recess adjacent said panel edge, moving said panel to place said marginal edge of said panel in the flowable bedding material in said recess and thereby displace some of the bedding material up side surfaces of said marginal edge portion of said panel, and heating the bedding material in said recess to cure the same to said rigid form thereof and thereby provide a bed for said panel in said frame which adheres to said panel and said frame.

References Cited

UNITED STATES PATENTS

| | | | |
|---|---|---|---|
| 3,440,121 | 4/1969 | Shockey | 156—293 |
| 3,430,333 | 4/1969 | Hodgen | 264—261 X |
| 3,381,340 | 5/1968 | Chapin | 264—261 X |
| 3,415,701 | 12/1968 | Haldane et al. | 156—293 X |
| 2,768,475 | 10/1956 | Seelen et al. | 156—109 X |
| 2,829,600 | 4/1958 | Sveda | 103—148 X |
| 3,098,698 | 7/1963 | Glynn | 264—261 |
| 3,171,360 | 3/1965 | Walton | 103—148 |
| 3,272,900 | 9/1966 | Ryan et al. | 264—261 X |
| 3,173,372 | 3/1965 | Baldwin | 103—148 X |
| 3,263,014 | 7/1966 | Deisenroth | 264—261 |

HAROLD ANSHER, Primary Examiner

U.S. Cl. X.R.

103—148; 156—244, 295; 161—190, 203, 219; 264—261, 279, 328, 331